(12) United States Patent
Guo et al.

(10) Patent No.: US 9,857,517 B2
(45) Date of Patent: Jan. 2, 2018

(54) LIGHT GUIDE PLATE, BACKLIGHT MODULE, AND DISPLAY DEVICE

(71) Applicants: SHENZHEN CHINA STAR OPTOELECTRONICS TECHNOLOGY CO., LTD., Shenzhen (CN); WUHAN CHINA STAR OPTOELECTRONICE TECHNOLOGY CO., LTD, Wuhan (CN)

(72) Inventors: Wei Guo, Shenzhen (CN); Jie Zeng, Shenzhen (CN); Zhongjie Liu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 88 days.

(21) Appl. No.: 14/646,019

(22) PCT Filed: Mar. 20, 2015

(86) PCT No.: PCT/CN2015/074687
§ 371 (c)(1),
(2) Date: May 20, 2015

(87) PCT Pub. No.: WO2016/138679
PCT Pub. Date: Sep. 9, 2016

(65) Prior Publication Data
US 2016/0377784 A1    Dec. 29, 2016

(30) Foreign Application Priority Data
Mar. 3, 2015  (CN) .......................... 2015 1 0094538

(51) Int. Cl.
*G02B 6/00*     (2006.01)
*F21V 8/00*     (2006.01)

(52) U.S. Cl.
CPC ........... *G02B 6/002* (2013.01); *G02B 6/0021* (2013.01); *G02B 6/0083* (2013.01); *G02B 6/0028* (2013.01); *G02B 6/0068* (2013.01)

(58) Field of Classification Search
CPC ........ G02B 6/002; G02B 6/0068; G02B 6/00; G02B 6/0011; F21V 19/00; F21V 17/00–17/20

(Continued)

(56) References Cited

U.S. PATENT DOCUMENTS 7,570,321 B2 * 8/2009 Takahashi ............ G02B 6/0018
  349/58
8,403,548 B2 * 3/2013 Kim ..................... G02B 6/0021
  349/64

(Continued)

*Primary Examiner* — Andrew Coughlin
*Assistant Examiner* — Michael Chiang
(74) *Attorney, Agent, or Firm* — Andrew C. Cheng

(57) ABSTRACT

The present invention provides a light guide plate, a backlight module, and a display device. The light guide plate contains a platform of uniform thickness along an edge of the light guide plate for installing a flexible printed circuit (FPC). The platform contains a plurality of through openings for installing light emitting diodes (LEDs). The backlight module contains LEDs, a FPC, and the light guide plate. The FPC is configured on the platform. The LEDs are configured inside the openings. The display device contains the backlight module. The present invention enhances the reliable connection between the FPC and light guide plate, reduces the probability of coupling failure, and lower the manufacturing difficulty and cost.

7 Claims, 3 Drawing Sheets

(58) Field of Classification Search
USPC ........... 362/612, 611, 613, 615, 628; 349/65
See application file for complete search history.

(56) References Cited

U.S. PATENT DOCUMENTS

| | | | | |
|---|---|---|---|---|
| 8,411,229 B2* | 4/2013 | Choo | .................... | G02B 6/0091 |
| | | | | 349/61 |
| 2008/0043171 A1 | 2/2008 | Takahashi et al. | | |
| 2008/0094855 A1* | 4/2008 | Yu | .......................... | G02B 6/009 |
| | | | | 362/634 |
| 2011/0025949 A1* | 2/2011 | Park | ..................... | G02B 6/0018 |
| | | | | 349/64 |
| 2011/0149594 A1 | 6/2011 | Terajima et al. | | |
| 2012/0182497 A1 | 7/2012 | Qi et al. | | |
| 2013/0002985 A1* | 1/2013 | Hosoki | ............. | G02F 1/133615 |
| | | | | 349/65 |
| 2013/0163282 A1* | 6/2013 | Kunimochi | .......... | G02B 6/0011 |
| | | | | 362/611 |
| 2014/0111740 A1 | 4/2014 | Nakagawa et al. | | |
| 2016/0077270 A1* | 3/2016 | Komano | .............. | G02B 6/0028 |
| | | | | 349/65 |

* cited by examiner

LIGHT GUIDE PLATE, BACKLIGHT MODULE, AND DISPLAY DEVICE

BACKGROUND OF THE INVENTION

1. Field of the Invention

The present invention generally relates to display technology, and particularly relates to a light guide plate, a backlight module, and a display device.

2. The Related Arts

In a display device, a backlight module is employed to provide sufficient and uniform illumination so that the display device is able to present images correctly. Light guide plate (LGP) is a one of the backlight module's components. A LGP is made of optical-grade acrylic or polycarbonate (PC), and a number of light dots are produced on the LGP by dot printing, injection molding, or hot pressing. The light dots interferes light beams' total reflection inside the LGP so that the light beams exit the LGP from a light emission face. By arranging the light dots into various densities and dimensions, the light emitted from the LGP can be uniformed.

As shown in FIG. 1, an existing backlight module contains the following components: a plastic frame 1, a LGP 2, a number of light emitting diodes (LEDs) 3, and a flexible printed circuit (FPC) 4. Usually the LEDs 3 are welded to pads on the FPC 4 and they can be considered as a single component. As shown in FIG. 2, a number of support elements 11 are configured on the plastic frame 1, and the LEDs 3 are installed between neighboring support elements 11 by adhesion. Additionally, a slope is usually configured at the rims of the LGP 2 so as to reduce the thickness of a major region of the LGP 2. FPC 4 is installed on the LGP 2 also by adhesion to facilitate the LEDs 3's optical coupling a light incident face of the LGP 2.

As the plastic frame 1 is required to be even thinner, the manufacturing of the protruding support elements is getting more difficult, and the stability of the product assembly is also compromised. Additionally, due to the slopes on the LGP, the interface between the LGP and the FPC is reduced to a line of contact. There can easily be relative motion between the LGP and the FPC, causing failure to the optical coupling.

SUMMARY OF THE INVENTION

The technical issue to be addressed by the present invention is to provide a light guide plate, a backlight module, and a display device so as to resolve the issues of manufacturing difficulty and inferior stability suffered by the prior art.

To address the technical issue, the present invention provides a light guide plate which contains a platform of uniform thickness along an edge of the light guide plate for installing a flexible printed circuit (FPC). The platform contains a number of through openings for installing light emitting diodes (LEDs).

The light guide plate further contains a blocking rim raised above the platform along an outer side of the openings which is adjacent to the edge of the light guide plate.

The light guide plate further contains a slope along an inner side of the openings which is opposite to the outer side and is adjacent to a major region of the light guide plate. The slope connects between the platform and the major region of the light guide plate. The thickness of the platform is greater than that of the main region of the light guide plate.

The blocking rim contains a number of notches allowing extension of the FPC so as to facilitate wire layout.

At least a side of the light guide plate that does not emit light is covered with a seal layer.

The seal layer is a silk printing layer.

To address the technical issue, the present invention also provides a backlight module which contains a number of LEDs, a FPC, and a light guide plate. The light guide plate contains a platform of uniform thickness along an edge of the light guide plate for installing the FPC, the platform contains a number of through openings for installing the LEDs. The LEDs are configured inside the openings. The FPC is configured on the platform.

The light guide plate further contains a blocking rim raised above the platform along an outer side of the openings which is adjacent to the edge of the light guide plate.

The light guide plate further contains a slope along an inner side of the openings which is opposite to the outer side and is adjacent to a major region of the light guide plate. The slope connects between the platform and the major region of the light guide plate. The thickness of the platform is greater than that of the main region of the light guide plate.

The blocking rim contains a number of notches allowing extension of the FPC so as to facilitate wire layout.

At least a side of the light guide plate that does not emit light is covered with a seal layer.

The seal layer is a silk printing layer.

The FPC is adhered to the platform.

The LEDs are welded to pads of the FPC.

To address the technical issue, the present invention further provides a display device which contains a backlight module. The backlight module contains a number of LEDs, a FPC, and a light guide plate. The light guide plate contains a platform of uniform thickness along an edge of the light guide plate for installing the FPC. The platform contains a number of through openings for installing the LEDs. The LEDs are configured inside the openings; and the FPC is configured on the platform.

The light guide plate further contains a blocking rim raised above the platform along an outer side of the openings which is adjacent to the edge of the light guide plate.

The light guide plate further contains a slope along an inner side of the openings which is opposite to the outer side and is adjacent to a major region of the light guide plate. The slope connects between the platform and the major region of the light guide plate. The thickness of the platform is greater than that of the main region of the light guide plate.

The blocking rim contains a number of notches allowing extension of the FPC so as to facilitate wire layout.

At least a side of the light guide plate that does not emit light is covered with a seal layer.

The seal layer is a silk printing layer.

The advantage of the present invention is that, with the through openings, the installation of LEDs to the light guide plate does not require a plastic frame, and there is no need to configured support elements on the plastic frame. All is required is to work out the openings on the light guide plate. The manufacturing difficulty and therefore cost are reduced. In addition, as the light guide plate has an enhanced integrity and robustness, the light guide plate provides superior structural strength and reliability when manufactured to a great dimension. Furthermore, the installation of FPC on the platform achieves a planar, rather than linear, contact between the FPC and the light guide plate, and the relative motion therebetween is as such avoided. The reliability of the connection between the FPC and the light guide plate is thereby enhanced and the steady positioning of the FPC is achieved, significantly reducing the probability of coupling failure.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
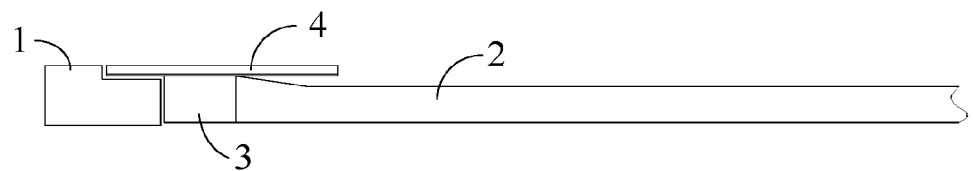
FIG. 1 is a cross-sectional diagram showing a conventional backlight module around one of its edges.
Figure 2:
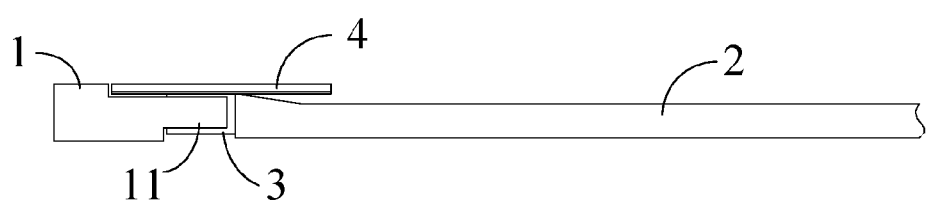
FIG. 2 is a cross-sectional diagram showing a conventional backlight module around one of its edges.
Figure 3:
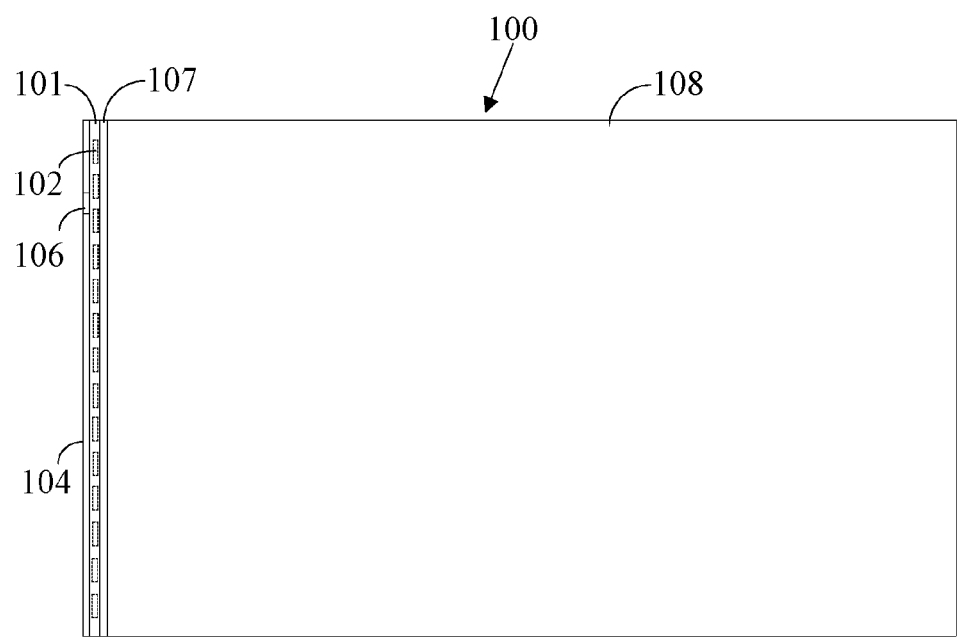
FIG. 3 is a front-view diagram showing a light guide plate according to an embodiment of the present invention.
Figure 4:
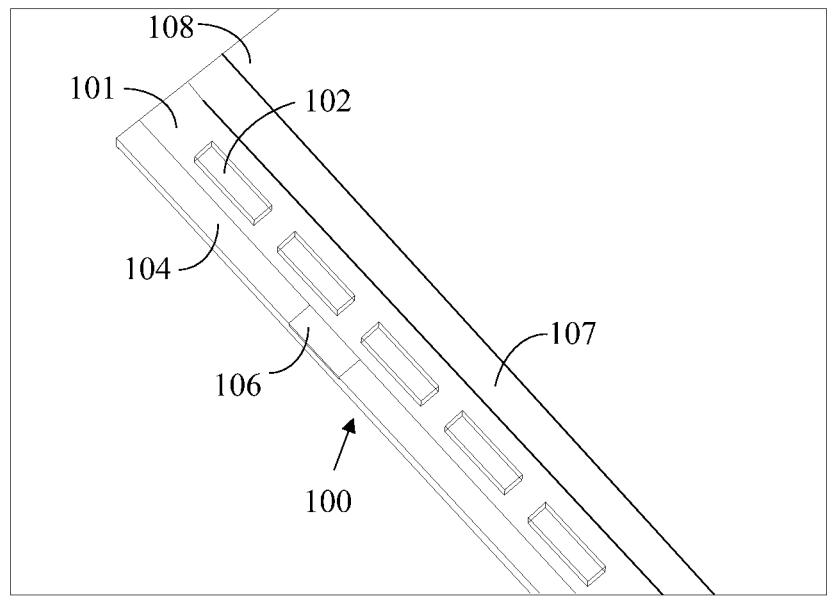
FIG. 4 is perspective diagram showing a corner of the light guide plate of FIG. 3.
Figure 5:
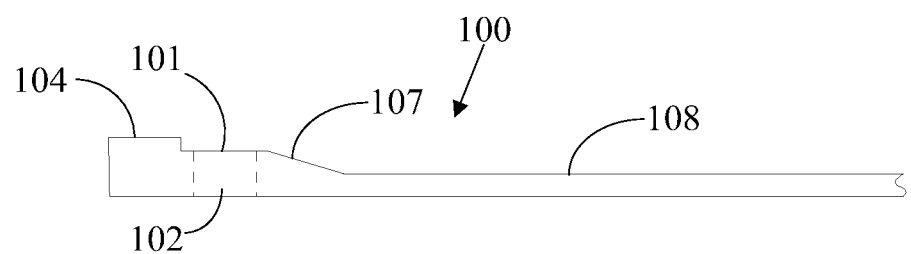
FIG. 5 is a sectional diagram showing the light guide plate of FIG. 3.

FIG. 3 is a front-view diagram showing a light guide plate 100 according to an embodiment of the present invention. FIG. 4 is perspective diagram showing a corner of the light guide plate 100 of FIG. 3. FIG. 5 is a sectional diagram showing the light guide plate 100 of FIG. 3.

The light guide plate 100 contains a platform 101 of uniform thickness along an edge of the light guide plate 100. The platform 101 is for the installation of a flexible printed circuit (FPC) and is configured with a number of through openings 102 where light emitting diodes (LEDs) are installed.

The installation of LEDs to the light guide plate 100 therefore does not require a plastic frame, and there is no need to configured support elements on the plastic frame. All is required is to work out the openings 102 on the light guide plate 100. The manufacturing difficulty and therefore cost are reduced. In addition, as the light guide plate 100 has an enhanced integrity and robustness, the light guide plate 100 provides superior structural strength and reliability when manufactured to a great dimension. Furthermore, the installation of FPC on the platform 101 achieves a planar, rather than linear, contact between the FPC and the light guide plate 100, and the relative motion therebetween is as such avoided. The reliability of the connection between the FPC and the light guide plate 100 is thereby enhanced and the steady positioning of the FPC is achieved, significantly reducing the probability of coupling failure.

As illustrated, alternatively, a blocking rim 104 can be configured on the light guide plate 100. A side of the openings 102 adjacent to the edge of the light guide plate 100 is referred to as the outer side, whereas an opposite side of the openings 102 is referred to as the inner side. The blocking rim 104 is raised above the platform 101 and is configured along the outer sides of the openings 102. The purpose of the blocking rim 104 is to provide fixation to the FPC from a lateral side so that its installation is even more stable. The blocking rim 104 contains a number of notches 106 allowing extension of FPC therethrough so as to facilitate wire layout.

Alternatively, the light guide plate 100 can further contains a slope 107.

The slope 107 is configured along the inner sides of the openings 102 and borders a main region 108 of the light guide plate 100. The platform 101 has a greater thickness than that of the main region 108 of the light guide plate 100. The platform 101 is configured only along the edge where the LEDs are to be arranged. The platform 101 joins to the main region 108 of the light guide plate 100 through the slope 107. The purpose of such design is to reduce the thickness of the light guide plate 100. Please note that the light guide plate 100 can be a planar one or a wedge-shaped one.

In addition, the various sides of the light guide plate 100 that do not emit light are covered with a seal layer. The seal layer can be a silk printing layer, such as white silk printing layer or black silk printing layer, to reflect or block light. The configuration of seal layers is applicable to the various light guide plates 100 described above.

Figure 6:
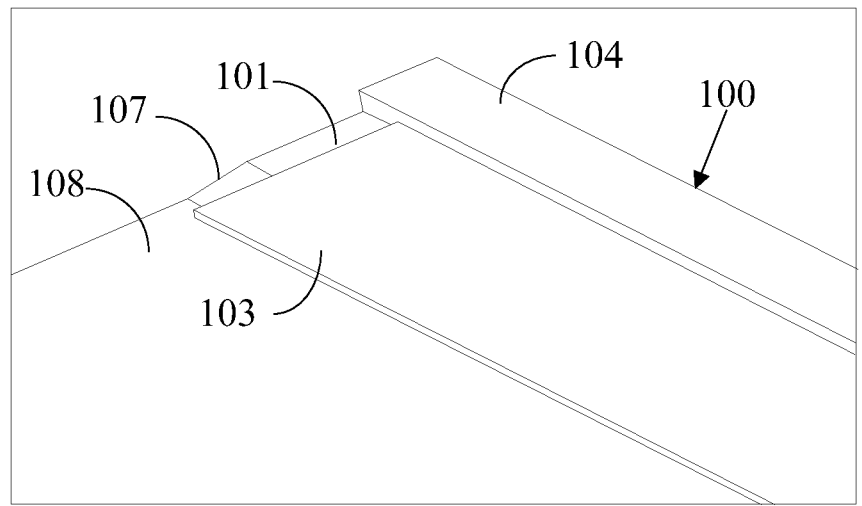
FIG. 6 is a perspective diagram showing a corner of a backlight module according to an embodiment of the present invention.
Figure 7:
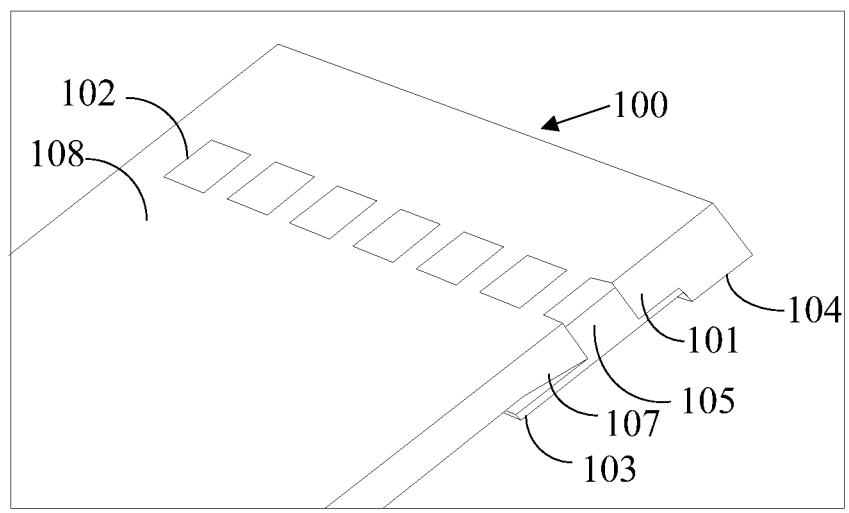
FIG. 7 is a perspective diagram showing a back side of the back light module of FIG. 6.
Figure 8:
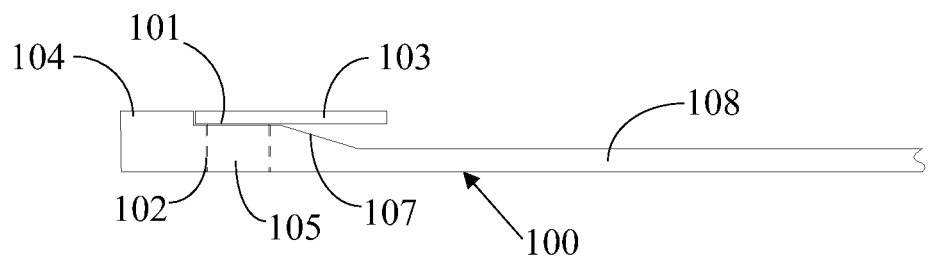
FIG. 8 is a sectional diagram showing the backlight module of FIG. 6.

FIG. 6 is a perspective diagram showing a corner of a backlight module according to an embodiment of the present invention. FIG. 7 is a perspective diagram showing a back side of the back light module of FIG. 6. FIG. 8 is a sectional diagram showing the backlight module of FIG. 6.

As illustrated, the backlight module contains LEDs 105, a FPC 103, and a light guide plate 100.

The light guide plate 100 contains a platform 101 of uniform thickness along an edge of the light guide plate 100 for the installation of the FPC 103. The platform 101 is configured with a number of through openings 102 within which the LEDs 105 are installed. The LEDs 105 are welded to pads on the FPC 103. The FPC 103 is adhered to the platform 101. Due to the planar contact between the FPC 103 and the platform 101, the connection between the two is more stable.

The light guide plate 100 can be of various shapes such as a planar light guide plate 100 or a wedge-shaped light guide plate 100. Alternatively, a slope 107 can be configured between the platform 101 and the main region 108 of the light guide plate 100. The thickness of the main region 108 of the light guide plate 100 is smaller than that of the platform 101. Alternatively, a blocking rim 104 can be configured along the outer sides of the openings 102. The blocking rim 104 is raised above the platform 101 to provide fixation to the FPC 103 from a lateral side so that its installation is even more stable.

The present invention further provides a display device incorporating the light guide plate and the backlight module described above.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A light guide plate comprising a main region, a platform of uniform thickness along an edge of the main region for installing a flexible printed circuit (FPC), a slope between the platform and the major region, and a linear blocking rim raised from a top side of the platform extending from one end of the platform to the other end of the platform along an outer side of the platform to laterally position the FPC, wherein the main region, platform, slope, and blocking rim are integrally formed; the platform comprises a plurality of through openings enclosed on four sides by the platform between the slope and the blocking rim for installing light emitting diodes (LEDs), the blocking rim comprises a plurality of notches connecting the top side of the platform to an outer side of the blocking rim allowing extension of the FPC so as to facilitate wire layout, and the thickness of the platform is greater than that of the main region.

2. The light guide plate as claimed in claim 1, wherein at least a side of the light guide plate that does not emit light is covered with a seal layer.

3. The light guide plate as claimed in claim 2, wherein the seal layer is a silk printing layer.

4. A backlight module comprising a plurality of LEDs, a FPC, and a light guide plate as claimed in claim 1, wherein the LEDs are configured inside the openings; and the FPC is configured on the platform.

5. The backlight module as claimed in claim 4, wherein the FPC is adhered to the platform.

6. The backlight module as claimed in claim 4, wherein the LEDs are welded to pads of the FPC.

7. A display device comprising a backlight module as claimed in claim 4.

* * * * *